Sept. 21, 1937.   F. MARASSO   2,093,466
DOUGH DIVIDER
Filed July 13, 1936   2 Sheets-Sheet 1

Inventor:
Fred Marasso,
by Charles E. Hervey
his Atty.

Sept. 21, 1937.  F. MARASSO  2,093,466
DOUGH DIVIDER
Filed July 13, 1936  2 Sheets-Sheet 2
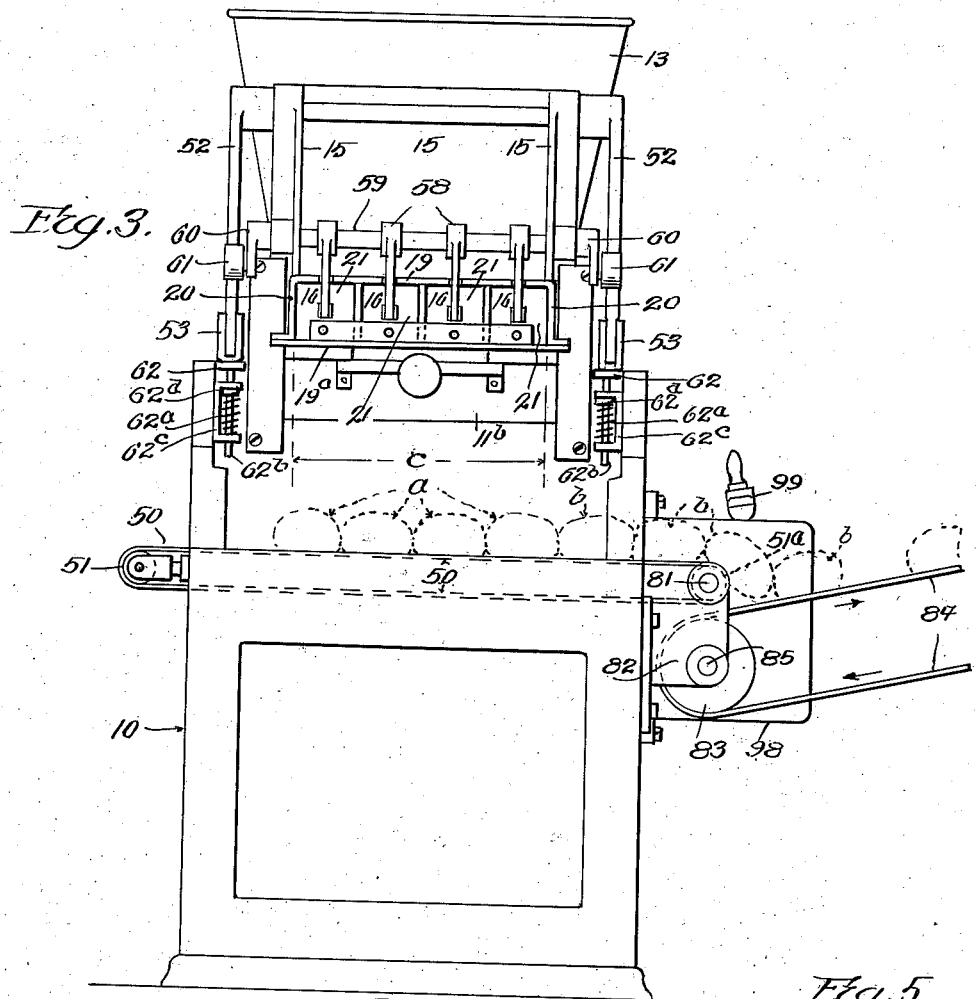
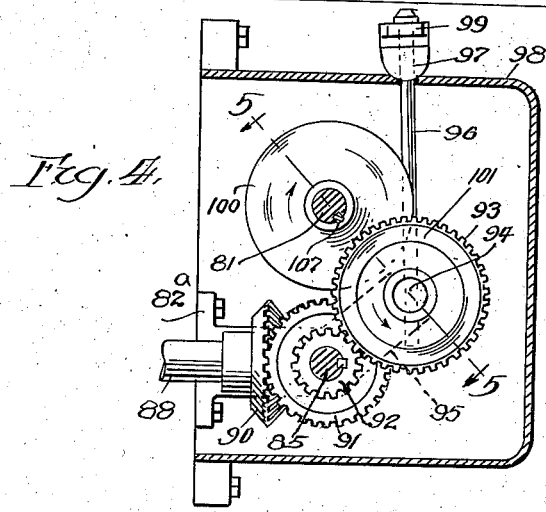
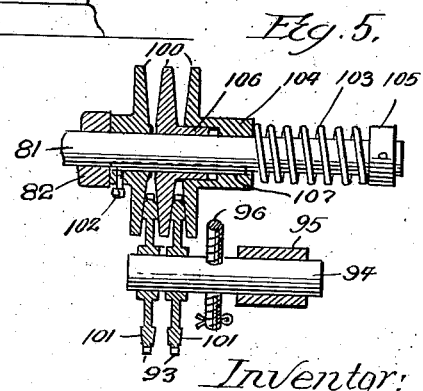
Inventor:
Fred Marasso, Patented Sept. 21, 1937

2,093,466

UNITED STATES PATENT OFFICE 2,093,466

DOUGH DIVIDER

Fred Marasso, Joliet, Ill., assignor to Union Machinery Company, Joliet, Ill., a corporation of Illinois Application July 13, 1936, Serial No. 90,330

9 Claims. (Cl. 107—15)

This invention relates to dough dividers and more particularly to plural pocket dough dividers; that is, dividers provided with a number of pockets in which several lumps of dough are measured simultaneously and from which the measured lumps of dough are discharged simultaneously.

In bakeries employing bakers' machinery, the divider is usually placed in advance of a rounder and after the dough lumps have been measured they are conveyed to the rounder for the rounding up operation. It is of importance that the lumps of dough be conveyed to the divider in uniformly spaced relation so that they will not pile up on each other in the rounder and, owing to the different consistencies of dough for various kinds of bread and buns, and owing to the different sizes of the dough lumps, heretofore it has been found very difficult to uniformly space the dough lumps apart from the time they are discharged from the measuring pockets until they reach the rounder.

The principal object of the present invention is to provide regulatable timing mechanism, whereby to deliver the dough lumps from the divider in accurately spaced relation, regardless of the consistency of the dough or the size of the dough lumps.

Another object is to provide regulatable timing mechanism in a dough divider, whereby the speed of the usual conveyor belt, upon which the dough lumps are discharged from the measuring pockets, may be regulated so as to space all of the dough lumps uniformly along the length of said conveyor belt, regardless of the consistency of the dough or the size of the dough lumps.

Another object is to provide timing mechanism of this character which shall be accurate, easily manipulated and capable of exceedingly fine adjustment.

The invention further consists in the several novel features hereinafter fully set forth and claimed.

The invention is clearly illustrated in the drawings accompanying this specification, in which:—

Fig. 3 is a front elevation of the divider;

Fig. 4 is a detail, vertical cross-section of the timing mechanism, taken on the line 4—4 of Fig. 2; and Fig. 5 is a detail, longitudinal section, taken on the line 5—5 of Fig. 4.

Figure 1:
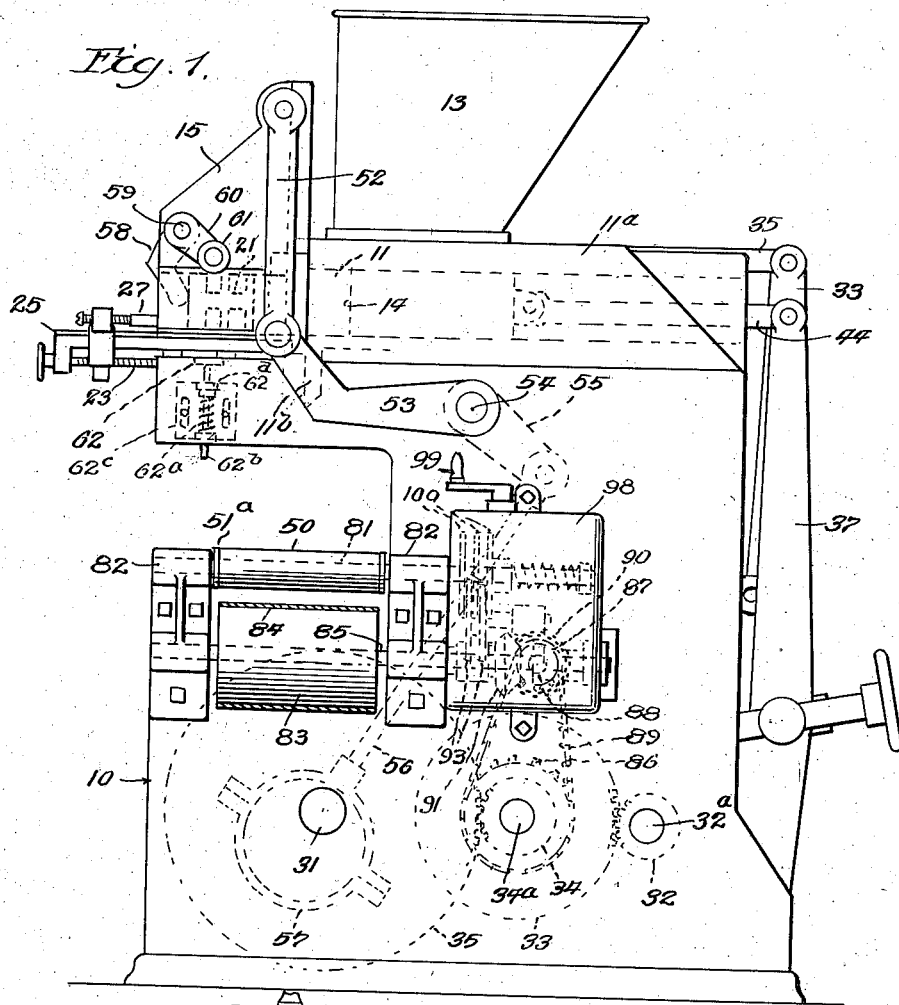
Fig. 1 is a side elevation of a dough divider equipped with timing mechanism embodying the present invention.
Figure 2:
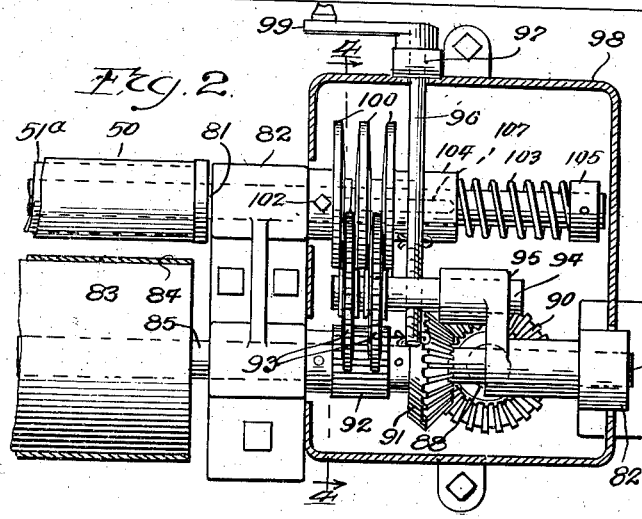
Fig. 2 is a detail, side elevation of the timing mechanism showing the casing thereof in section.

Referring to said drawings, which illustrate the invention applied to a dough divider, such as is shown and described in Letters Patent Number 2,007,686, dated July 9, 1935, issued upon an application filed by me, the general construction and mode of operation of the dough dividing mechanism illustrated in the accompanying drawings, is substantially the same as that shown and described in the above mentioned patent.

First I shall briefly describe the dough divider illustrated, using the same reference characters for parts that correspond with the same parts of the dough divider shown and described in said Letters Patent.

The reference character 10 designates the supporting frame of the divider which carries the operating mechanism of the machine. At the upper end of the frame is a casing 11$^a$, within which is a rectangular charging chamber 11, above which is a hopper 13 through which dough is fed into the charging chamber. In the charging chamber is a ram 14 operated by a lever 37. At one end of the charging chamber is a vertically movable head 15 having a plurality of dough measuring pockets 16 into which the dough is forced from the charging chamber by the ram.

The head is divided into the several measuring pockets by top and bottom walls 19, 19$^a$, and upright walls 20, and in said pockets are reciprocable ejecting plungers 21 against which the dough is forced from the charging chamber. Adjustment means 23, 25, 27 are provided for determining the rear limit of movement of the plungers in the pockets and thereby determining the capacity thereof. The adjustment means may be substantially the same as that shown in the prior patent above referred to. Between the head and charging chamber is a vertical wall 11$^b$ having openings therein through which the dough enters the measuring pockets from the charging chamber. The wall 11$^b$ closes the front end of the pockets when the head is moved down and holds the dough therein until the pockets are moved below the lower edge of the wall 11$^b$.

Swinging arms 58, one for each plunger 21, and mounted on a shaft 59 journaled in the head 15, engage the rear ends of the plungers, and crank arms 60 on the ends of the shaft are employed to actuate the swinging arms, whereby to press them against the plungers and thereby move them through their ejecting stroke. On the ends of the crank arms 60 are rollers 61 that encounter shoulders 62, when the head is lowered, thereby swinging up the crank arms and therewith swinging forward the swinging arms 58 and moving the plungers through their ejecting stroke.

The shoulders 62 contain novel subject matter and will be described at this place. The shoulders 62 are spring pressed in an upward direction by coiled compression springs 62a, whereby to absorb the shock imparted to the shoulders by the rollers 61. The shoulders are mounted upon stems 62b, slidably mounted in brackets 62c secured to the two side members of the frame 10. A stop member 62d is secured to each stem and provides an abutment for the upper end of the spring. The stop member is yieldably held against the upper ear of the bracket by the spring, thereby holding the shoulder in position to be encountered by the roller when the head is lowered.

The head 15 is reciprocated by links 52 connected to the head, and levers 53, 55 mounted upon a shaft 54 and connected to an eccentric 57 by a rod 56. The eccentric is mounted upon a shaft 31 which is geared to the main drive shaft 32a by a train of gears 32, 33, 34, 35, as in the prior patent above referred to. The levers 33, 37 and links 35, 44, corresponds with the ram actuating lever and link, and the knife actuating lever and link, shown in the above mentioned prior patent. Extending across the front end of the machine, below the measuring head, is the conveyor belt 50, upon which dough lumps are discharged, in groups, from the measuring head. The conveyor belt is trained around pulleys 51 mounted on bearing brackets located on the two sides of the divider.

In the aforesaid letters patent lump spacing mechanism is shown and described. This mechanism has been omitted from the accompanying drawings, but it is to be understood that the present divider may be equipped with lump spacing mechanism if desired, as it serves to uniformly space the lumps of each group.

For a further understanding of the construction and mode of operation of the divider above briefly described, reference may be had to the aforesaid prior patent.

I shall now proceed to describe the timing mechanism for the conveyor belt 50, whereby its speed may be regulated to uniformly space the dough lumps thereon. The pulley at the discharge end of the conveyor belt and which is designated by the reference character 51a, is mounted upon a shaft 81 journaled in bearing brackets 82 mounted on one side of the divider. Below the pulley 51a is a large pulley 83 over which is trained a conveyor belt 84, which conveys the dough lumps from the divider to the rounder or to any other desired place. The pulley 83 is mounted upon a pulley shaft 85 also journaled in the bearing brackets 82. The shaft 85 is driven from one of the driven shafts of the divider, for instance, the shaft designated by the character 34a, by suitable gearing, here shown as comprising a sprocket wheel 86 mounted on the shaft 34a, a sprocket wheel 87 mounted on a shaft 88, journaled in bearings (not shown) carried by the frame 10, and a sprocket chain 89 trained around said sprocket wheels. The shaft 88 protrudes through the side wall of the frame 10 and has a bevel gear wheel 90 mounted upon its end, which bevel gear wheel meshes with a bevel gear wheel 91 that is mounted on one end of the pulley shaft 85. Between the pulley shafts 81, 85 is regulatable timing gearing, whereby the pulley 51a may be driven at any desired speed, within given limits, so as to move the conveyor belt 50 at the exact speed required to space the lumps of dough uniformly along the length of the conveyor belt, irrespective of the consistency of the dough or the size of the dough lumps. In the form of timing gearing illustrated, a pinion 92 is mounted upon the shaft 85 and meshes with one or more gear wheels or toothed discs 93, two being shown, said gear wheels being mounted upon a shaft 94 mounted in a rocker arm 95, which is swingably mounted on the pulley shaft 85, or on an axis concentric therewith. Desirably a bearing bracket 82a is provided for the extreme end of the pulley shaft 85. The rocker arm 95 and therewith the gear wheels 93 are capable of oscillating about the axis of the pulley shaft 85. Means are provided for adjusting the gear wheels 93, said means being shown as comprising a rod 96, threaded upon one end and threadedly engaged in a bore in the gear shaft 94. Upon the upper end of the rod 96 is a segmental block 97 which bears upon the top of a gear casing 98 which is provided for enclosing the timing gearing. The adjustment rod is provided with a handle or crank arm 99, whereby it may be turned to swing the gear shaft 94 and therewith the gear wheels 93 about the axis of the pulley shaft 85.

Mounted upon the pulley shaft 81, so as to rotate therewith, are friction discs 100, three being shown, which are frictionally engaged by friction faces on the gear wheels 93. The side faces of the friction discs 100 are slightly tapered and the gear wheels are provided with correspondingly tapered side faces 101, which frictionally engage with the tapered side faces of the friction discs 100.

One of the friction discs 100 may be rigidly fastened to the pulley shaft 81 as by a set screw 102, while the other two friction discs are slidably mounted on said shaft and are spring pressed in a direction to engage with the tapered friction faces of the gear wheels 93 by a coiled compression spring 103 interposed between the hub 104 of one of the friction discs 100 and a collar 105 fastened upon the end of the pulley shaft 81. The middle friction disc is formed with a hub 106 which slides in a recess formed in the hub 104, and a spline or feather 107 seated in the pulley shaft 81 engages in grooves formed in the hubs of the three friction discs 100.

The compression spring 103 holds the friction discs in frictional engagement with the friction side faces 101 of the gear wheels 93, whereby rotation of the pulley shaft 85 is transmitted to the pulley shaft 81. In order to change the speed of the conveyor belt 50, the crank 99 is turned in either direction. By turning it in the direction which swings the gear wheels 93 closer to the pulley shaft 81, the speed of the conveyor belt is therewith increased, and by rotating the crank in the reverse direction the speed of the conveyor belt is reduced. Obviously with the type of timing gearing illustrated, any exact speed, within given limits, may be imparted to the conveyor belt.

In Fig. 3 of the drawings is shown, in dotted lines, a group of dough lumps, indicated by the reference character, a, which have been deposited on the conveyor belt 50 from the measuring pockets 16, and a group of dough lumps, b, beyond the group, a, which were deposited upon the conveyor belt 50 immediately prior to the group, a. It is to be observed that when the dough lumps have been deposited upon the conveyor belt 50 they flatten down and spread out, more or less depending upon the consistency of the dough and the size of the dough lumps, and as a result the total length of the group of dough lumps is greater than the total length of the several measuring pockets, as indicated at c. Usually the larger size dough lumps contact with each other after being deposited on the conveyor belt 50. If the speed of the conveyor belt has been previously set for handling the larger dough lumps, there would be a considerable gap between each group of dough lumps and the next adjacent group, and if the speed of the conveyor belt were set for handling smaller dough lumps than those shown, the end lump of one group would overlap the adjacent lump of the previously deposited group of dough lumps.

By observing the spacing and the flattened condition of the dough lumps as they fall upon the conveyor belt 50, the attendant turns the crank 99 in a clockwise or a contra-clockwise direction, as the case may be, thereby speeding up or retarding the speed of the conveyor belt 50, so as to cause it to travel at a rate of speed whereby the dough lumps are uniformly spaced along its length.

I claim as new and desire to secure by Letters Patent:

1. A dough divider having a plural pocket dividing head, means for discharging groups of dough lumps from the head in regular succession, and driving mechanism therefor, in combination with a conveyor belt upon which the groups of dough lumps are deposited along its length, and regulatable, friction drive timing mechanism for said conveyor belt having means for imparting all speeds from a minimum to a maximum speed within given limits, to the conveyor belt, said timing mechanism being driven from the aforesaid driving mechanism.

2. A dough divider having a plural pocket dividing head, means for discharging groups of dough lumps from the head in regular succession, and driving mechanism therefor, in combination with a conveyor belt upon which the groups of dough lumps are deposited along its length, and regulatable timing mechanism for said conveyor belt comprising friction discs, one operatively connected with the conveyor belt and one operatively connected with the aforesaid driving mechanism, a mounting for the second named friction disc, and means to adjust said second named friction disc along the face of the first mentioned friction disc toward and away from its axis, whereby to impart all speeds from a minimum to a maximum speed, within given limits.

3. A dough divider having a plural pocket dividing head, means for discharging groups of dough lumps from the head in regular succession, and driving mechanism therefor, in combination with a conveyor belt upon which the groups of dough lumps are deposited along its length, a belt pulley for said conveyor belt, a pulley shaft therefor, a driven friction disc mounted on said shaft, a driving friction disc held in frictional contact with said driven friction disc and movable toward and away from the axis thereof, a mounting for said driving friction disc and driving connections between the aforesaid driving mechanism and the driving friction disc.

4. A dough divider having a plural pocket dividing head, means for discharging groups of dough lumps from the head in regular succession, and driving mechanism therefor, in combination with a conveyor belt upon which the groups of dough lumps are deposited along its length, and regulatable timing mechanism for said conveyor belt comprising friction discs, one operatively connected with the conveyor belt and one operatively connected with the aforesaid driving mechanism, the latter friction disc being adjustable along the face of the first mentioned friction disc, yieldable means to hold said friction discs in frictional contact, a rocker arm for supporting the adjustable friction disc, and means to adjust said arm.

5. A dough divider having a plural pocket dividing head, means for discharging groups of dough lumps from the head in regular succession, and driving mechanism therefor, in combination with a conveyor belt upon which the groups of dough lumps are deposited along its length, a belt pulley and shaft for said belt, a plurality of friction discs slidably, but non-rotatably, mounted on said shaft, a swinging shaft, gear wheels mounted on said swinging shaft and having friction faces held in frictional engagement with said friction discs, a rocker arm carrying said swinging shaft, means to adjust said arm, a pinion meshing with said gear wheels, a shaft carrying said pinion and driving connections between said last mentioned shaft and the aforesaid driving mechanism.

6. In a plural pocket dough divider, the combination of a conveyor belt upon which groups of dough lumps are deposited in regular succession, a high speed conveyor belt running from the discharge end of said first mentioned conveyor belt, pulleys and shafts for said belts, and regulatable timing gear mechanism between said shafts having frictionally engaged rotatable elements, for imparting all speeds from a minimum to a maximum speed within given limits, to the shaft of a pulley for the first mentioned conveyor belt.

7. In a plural pocket dough divider, the combination of a conveyor belt upon which groups of dough lumps are deposited in regular succession, a high speed conveyor belt running from the discharge end of said first mentioned conveyor belt, pulleys and shafts for said belts, and timing gear mechanism between said shafts having frictionally engaged rotatable elements, for imparting all speeds from a minimum to a maximum speed within given limits, to the shaft of a pulley for the first mentioned conveyor belt, a rocking support for one of said rotatable elements, and means to adjust said support, whereby to vary the speed of the first mentioned conveyor belt.

8. In a plural pocket dough divider, the combination of a conveyor belt upon which groups of dough lumps are deposited in regular succession, a high speed conveyor belt running from the discharge end of said first mentioned conveyor belt, pulleys and shafts for said belts, and regulatable, variable speed friction drive mechanism between said shafts, said variable speed friction drive mechanism having means for imparting all speeds from a minimum to a maximum within given limits, to the shaft of a pulley for the first mentioned conveyor belt.

9. In a dough divider, the combination of a vertically reciprocatory dividing head having several pockets therein, plungers in said pockets, rocking means to move said plungers, including crank arms, and yieldably supported shoulders which are engaged by said crank arms when the dividing head is lowered, whereby to actuate said rocking means.

FRED MARASSO.